ns*# United States Patent [19]

Götz et al.

[11] Patent Number: 5,468,530
[45] Date of Patent: Nov. 21, 1995

[54] PPE/PA MOLDING MATERIALS FOR THE PRODUCTION OF MOLDINGS BY MEANS OF BLOW MOLDING, PROFILE EXTRUSION AND PIPE EXTRUSION

[75] Inventors: Walter Götz, Ludwigshafen; Axel Gottschalk, Neustadt, both of Germany

[73] Assignee: BASF Aktiengesellschaft, Ludwigshafen, Germany

[21] Appl. No.: 341,998

[22] Filed: Nov. 16, 1994

[30] Foreign Application Priority Data

Nov. 22, 1993 [DE] Germany ............... 43 39 509.0

[51] Int. Cl.$^6$ .............. B29D 23/00; C08K 5/51; C08L 71/12; C08L 77/00
[52] U.S. Cl. .............. 428/36.4; 428/36.92; 524/128; 525/397
[58] Field of Search ............ 525/397; 524/128; 428/36.4, 36.92

[56] References Cited

U.S. PATENT DOCUMENTS

| | | | |
|---|---|---|---|
| 4,876,127 | 10/1989 | Khanna et al. ............ | 428/35.7 |
| 4,957,966 | 9/1990 | Nishio et al. ............ | 525/68 |
| 4,990,564 | 2/1991 | Taubitz et al. ............ | 525/66 |
| 5,073,596 | 12/1991 | Inoue et al. ............ | 525/92 |
| 5,147,942 | 9/1992 | Abe et al. ............ | 525/68 |
| 5,159,008 | 10/1992 | Nishida et al. ............ | 524/538 |
| 5,159,018 | 10/1992 | Nishio et al. ............ | 525/68 |
| 5,200,450 | 4/1993 | Blinne et al. ............ | 524/420 |
| 5,254,620 | 10/1993 | Goetz et al. ............ | 525/425 |
| 5,296,563 | 3/1994 | Gottschalk et al. ............ | 525/66 |
| 5,310,821 | 5/1994 | Kodaira et al. ............ | 525/397 |

FOREIGN PATENT DOCUMENTS

| | | |
|---|---|---|
| 24120 | 2/1981 | European Pat. Off. . |
| 244090 | 11/1987 | European Pat. Off. . |
| 262961 | 4/1988 | European Pat. Off. . |
| 501154 | 9/1992 | European Pat. Off. . |
| 1520250 | 5/1962 | Germany . |
| 46040 | 2/1982 | Japan . |

*Primary Examiner*—Thomas Hamilton, III
*Attorney, Agent, or Firm*—Keil & Weinkauf

[57] ABSTRACT

High molecular weight thermoplastic molding materials are obtainable by mixing

A) 20–80% by weight of a polyphenylene ether and

B) 0–70% by weight of conventional additives and processing assistants into a melt of c) 10–80% by weight of a low molecular weight polyamide having a viscosity number of from 40 to 185 ml/g and subsequently carrying out solid-phase postcondensation.

10 Claims, No Drawings

PPE/PA MOLDING MATERIALS FOR THE PRODUCTION OF MOLDINGS BY MEANS OF BLOW MOLDING, PROFILE EXTRUSION AND PIPE EXTRUSION

The present invention relates to high molecular weight thermoplastic molding materials obtainable by mixing A) 20–80% by weight of a polyphenylene ether and B) 0–70% by weight of conventional additives and processing assistants into a melt of C) 10–80% by weight of a low molecular weight polyamide having a viscosity number of from 40 to 185 ml/g and subsequently carrying out solid-phase postcondensation.

The present invention furthermore relates to a process for the preparation of novel molding materials and the use thereof for the production of moldings and the moldings obtainable therefrom.

Polyamide/polyphenylene ether blends are disclosed in, inter alia, EP-A 24120, 46040, 244090 and 262961. PPE/PA blends are mixtures of two incompatible polymers which are used in many areas since they have an interesting property spectrum overall.

Accordingly, a large number of applications describe possibilities for improving the phase adhesion of different polymer matrices.

However, the known blends are subject to limitations with regard to processing to give blow-molded articles. In blow molding, a tube is generally extruded from the polymer melt which is suspended between the two half-shells of the open mold. The mold is then closed and the polymer tube is pressed against the mold by internal gas pressure, cooled and removed from the mold.

An essential precondition for this processing is that the polymer tube does not tear during extrusion while it is suspended freely between the molds, so that the shaping process can be completed. It is also desirable that the tube does not sag, since small wall thicknesses in the upper half and greater wall thicknesses in the lower half result. Hollow articles having different wall thicknesses are unsuitable for use since the strength is generally limited by the point having the smallest wall thickness. The known PPE/PA molding materials are therefore suitable only to a very limited extent for the blow molding process since the tube strength is too low.

Both factors are determined by the melt rigidity, which depends primarily on the melt viscosity. A high melt viscosity in conjunction with low shearing, ie. after extrusion, but a low melt viscosity with a high shear gradient, ie. in the processing extruder, would be ideal.

Conventional high molecular weight polymers are therefore used for blow molding.

However, compounding of high molecular weight PPE/PA blends, in particular in the presence of glass fibers, is not possible since the molecular weight of the polyamide decreases during compounding, giving rise in every case to materials unsuitable for blow molding, even when high molecular weight polyamide is used as the starting polymer.

If high molecular weight PPE, as a starting polymer, is reacted with a polyamide of conventional viscosity, the melt viscosities during processing to give the blend are so high that the dispersing of the PPE is insufficient. Correspondingly, blends having poor properties are obtained since, in these blends, the polyamide forms the matrix in which the PPE is present in disperse form.

It is an object of the present invention to provide high molecular weight PPE/PA blends which, in reinforced and unreinforced form, can be readily processed to give blow-molded articles, extruded profiles or extruded pipes, so that in particular it is possible to produce moldings having a large volume from these materials.

We have found that this object is achieved, according to the invention, by the PPE/PA molding materials defined at the outset.

Preferred embodiments are described in the subclaims.

We have found, surprisingly, that the thermal aftertreatment increases the melt viscosity of the molding materials and does so in the case of both reinforced and unreinforced materials (regardless of the additives B) desired in each case).

In addition, the other blend component PPE and the good phase adhesion of the two polymers are not affected.

The novel molding materials contain, as component A), from 20 to 80, preferably from 30 to 65, in particular from 40 to 60, % by weight of a polyphenylene ether, up to 50, preferably up to 30, % by weight, based on B), of which may be replaced by a vinylaromatic polymer.

The polyphenylene ethers generally have a weight average molecular weight of from 10,000 to 80,000, preferably from 20,000 to 60,000.

This corresponds to a reduced specific viscosity ($\eta_{red}$) of from 0.2 to 0.9, preferably from 0.35 to 0.8, in particular from 0.45 to 0.6, dl/g, measured in a 0.5% strength by weight solution in chloroform at 25° C. according to DIN 53 726.

Suitable polyphenylene ethers $a_1$) are known per se and are preferably prepared by oxidative coupling of phenols disubstituted in the o position.

Examples of substituents are halogen, such as chlorine or bromine, and alkyl of 1 to 4 carbon atoms, which preferably has no α-tertiary hydrogen atom, for example, methyl, ethyl, propyl or butyl. The alkyl radicals may in turn be substituted by halogen, such as chlorine or bromine, or by hydroxyl. Further examples of possible substituents are alkoxy, preferably of up to 4 carbon atoms, or phenyl which is unsubstituted or substituted by halogen and/or by alkyl. Copolymers of different phenols, for example copolymers of 2,6-dimethylphenol and 2,3,6-trimethylphenol, are also suitable. Mixtures of different polyphenylene ethers may of course also be used.

Preferably used polyphenylene ethers are those which are compatible with vinylaromatic polymers, ie. completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Examples of polyphenylene ethers are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2,6-di-chloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly(2-chloro-1,4-phenylene ether) and poly(2,5-dibromo-1,4-phenylene ether). Preferably used polyphenylene ethers are those in which the substituents are alkyl of 1 to 4 carbon atoms, such as poly(2,6-dimethyl-1,4phenylene ether), poly(2,6-diethyl-1,4-phenylene ether), poly(2-methyl-6-ethyl-1,4-phenylene ether), poly(2-methyl-6-propyl-1,4-phenylene ether), Poly(2,6-dipropyl-1,4-phenylene ether) and poly(2-ethyl-6-propyl-1,4-phenylene ether).

Graft copolymers of polyphenylene ether and vinylaromatic polymers, such as polymers of styrene, α-methylstyrene, vinyltoluene and chlorostyrene, are also suitable.

Functionalized or modified polyphenylene ethers, as disclosed in, for example, WO-A 86/02086, WO-A 87/00540, EP-A-222 246, EP-A-223 116 and EP-A-254 048, are preferably used.

During their preparation, a polyphenylene ether $a_1$) is usually modified by incorporating at least one carbonyl, carboxyl, anhydride, amido, imido, carboxylic ester, carboxylate, amino, hydroxyl, epoxy, oxazolyl, urethane, urea, lactam or halobenzyl group so that better compatibility with the polyamide is achieved.

The modification is carried out in general by reacting a polyphenylene ether $a_1$) with a modifier which contains at least one of the abovementioned groups, in solution (WO-A 86/2086), in aqueous dispersion, in a gas-phase process (EP-A-25 200) or in the melt, in the presence or absence of suitable vinylaromatic polymers or impact modifiers, it being possible for free radical initiators to be present.

A modified polyphenylene ether which is obtainable by reacting $a_1$) 70–99.5, preferably 75–95, % by weight of an unmodified polyphenylene ether, $a_2$) 0–29.95, preferably 4.89–20, % by weight of a vinylaromatic polymer, $a_3$) 0.05–30, preferably 0.1–5, % by weight of at least one compound selected from the group consisting of $a_{31}$) α,β-unsaturated dicarbonyl compounds, $a_{32}$) amido-containing monomers having a polymerizable double bond and $a_{33}$) lactam-containing monomers having a polymerizable double bond, and $a_4$) 0–5, preferably 0.01–0.09, % by weight of free radical initiator, the percentages by weight being based on the sum of $a_1$) to $a_4$), in a suitable mixing and kneading unit, such as a twin-screw extruder, is preferably used as component A) in the novel molding materials. The residence time is preferably from 0.5 to 15 minutes at from 240° to 375° C.

The vinylaromatic polymer $a_2$) is preferably compatible with the polyphenylene ether used.

The molecular weight of these polymers which are known per se and are commercially available is in general from 1500 to 2,000,000, preferably from 70,000 to 1,000,000.

Examples of preferred vinylaromatic polymers $a_2$) which are compatible with polyphenylene ethers are described in the abovementioned monography by Olabisi, pages 224 to 230 and 245. Vinylaromatic polymers of styrene, chlorostyrene, α-methylstyrene and p-methylstyrene are mentioned here merely as typical examples; comonomers such as (meth)acrylonitrile or (meth)acrylic acid may also be present in the composition in minor amounts, preferably not more than 20, in particular not more than 8, % by weight. Particularly preferred vinylaromatic polymers are polystyrene and high impact polystyrene. Mixtures of these polymers may of course also be used. The preparation is preferably carried out by the process described in EP-A-302 485.

Examples of suitable modifiers $a_3$) are maleic acid, methyl maleic acid, itaconic acid, tetrahydrophthalic acid, the anhydrides and imides thereof, fumaric acid, the mono- and diesters of these acids, for example with $C_1$— and $C_2$—$C_8$-alkanols (monomers $a_{31}$), the mono- or diamides of these acids, such as N-phenylmaleimide (monomers $a_{32}$) and maleic hydrazide. Other suitable modifiers are the acyl chloride of trimellitic anhydride, benzene-1,2-dicarbonyl anhydride-4-carboxylic-acetic anhydride, chloroethanoyl-succinaldehyde, chloroformylsuccinaldehyde, citric acid and hydroxysuccinic acid. Examples of monomers $a_{33}$) are N-vinylpyrrolidone and (meth)acryloylcaprolactam.

Examples of free radical initiators $a_4$) are di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butyl peroxyisopropylcarbonate, tert-butylperoxy-3,3,5-trimethylhexanoate, tert-butyl peracetate, tert-butyl perbenzoate, butyl 4,4-di-tert-butylperoxy-valerate, 2,2-di-tert-butylperoxybutane, dicumyl peroxide, tert-butyl cumyl peroxide, 1,3-di-(tert-butylperoxyisopropyl)benzene and di-tert-butyl peroxide. Other examples are organic hydroperoxides, such as diisopropylbenzyl monohydroperoxide, cumyl hydroperoxide, tert-butyl hydroperoxide, p-menthyl hydroperoxide and pinane hydroperoxide, and highly branched alkanes of the general structure

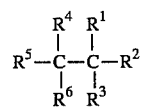

where $R^1$ to $R^6$ are alkyl of 1 to 8 carbon atoms, alkoxy of 1 to 8 carbon atoms, aryl, such as phenyl or naphthyl, or 5-membered or 6-membered heterocyclic structures having a Π-electron system and nitrogen, oxygen or sulfur as heteroatoms. $R^1$ to $R^6$ may in turn contain functional groups as substituents, such as carboxyl, carboxyl derivatives, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

The novel molding materials contain, as component B), from 0 to 70, preferably up to 50, in particular up to 40, % by weight of conventional additives and processing assistants. The stated amounts are based in each case on the total weight of components A) to C), the percentages by weight of components A) to C) together giving 100%.

Conventional impact modifiers B) which are suitable for polyamides (component C), and rubbers B) which usually toughen polyphenylene ethers A), may be used.

The conventional toughening polymers (also referred to as impact modifiers, elastomers or rubbers) which are used for improving the toughness of polyamides or polyphenylene ethers are employed as component B), in amounts of from 0 to 30, preferably from 3 to 20, in particular from 5 to 15, % by weight.

Examples of rubbers which increase the toughness of polyphenylene ethers are polyoctenylenes, graft rubbers having a crosslinked, elastomeric core, which is derived, for example, from butadiene, isoprene or alkyl acrylates, and a grafted shell comprising polystyrene, as well as copolymers of ethylene and acrylates or methacrylates and the ethylene/propylene (EP) and ethylene/propylene/diene (EPDM) rubbers, and the EP and EPDM rubbers grafted with styrene.

Block copolymers having up to 6, preferably up to 4, identical or different blocks, which may be bonded in linear or star-like form (ie. radial block copolymers), may also be used.

Mixtures of block copolymers having different structures, for example mixtures of two- and three-block copolymers or of hydrogenated and unhydrogenated block copolymers, may also be used.

Polymers toughened in this manner are known per se and are described in the literature. Merely by way of example, reference may be made here to U.S. Pat. No. 4 085 163, U.S. Pat. No. 4 041 103, U.S. Pat. No. 3 149 182, U.S. Pat. No. 3 231 635 and U.S. Pat. No. 3 462 162.

Corresponding products are also commercially available, for example a polyoctylene having the name Vestenamer® (Hüls AG), and a large number of suitable block copolymers having at least one vinylaromatic and one elastomeric block. Examples are the Cariflex®-TR types (Shell), the Kraton®-G types (Shell), the Finaprene® types (Fina) and the Europrene® SOL-TR types (Enichem).

Rubbers which increase the toughness of polyamides inter alia have two different features: they contain an elastomeric component which has a glass transition temperature of less than $-10°$ C., preferably less than $-30°$ C., and they contain at least one functional group which is capable of reacting with the polyamide. Examples of suitable functional groups are carboxyl, anhydride, carboxylic ester, carboxamido, carboximido, amino, hydroxyl, epoxy, urethane and oxazolyl.

Examples of rubbers which increase the toughness of polyamides are EP and EPDM rubbers which have been grafted with the abovementioned functional groups. Examples of suitable grafting reagents are maleic anhydride, itaconic acid, acrylic acid, glycidyl acrylate and glycidyl methacrylate. These monomers may be grafted onto the polymer in the melt or in solution, in the presence or absence of a free radical initiator, such as cumyl hydroperoxide.

Copolymers of $\alpha$-olefins may also be mentioned. The $\alpha$-olefins are usually monomers of 2 to 8 carbon atoms, preferably ethylene and propylene. Comonomers which have proven suitable are alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate. Mixtures of different comonomers may also be used. Copolymers of ethylene with ethyl or butyl acrylate and acrylic acid and/or maleic anhydride have proven particularly useful.

The copolymers can be prepared in a high pressure process at from 400 to 4500 bar or by grafting the comonomers onto the poly-$\alpha$-olefin. The proportion of the $\alpha$-olefin in the copolymer is in general from 99.95 to 55% by weight.

A further group of suitable elastomers comprises core/shell graft rubbers. These are graft rubbers which are prepared in emulsion and consist of at least one rigid and one flexible component. Rigid component is usually understood as meaning a polymer having a glass transition temperature of at least $25°$ C., and a flexible component is understood as meaning a polymer having a glass transition temperature of not more than $0°$ C. These products have a structure comprising a core and at least one shell, the structure being determined by the sequence of addition of the monomers. The flexible components are derived in general from butadiene, isoprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The rigid components are derived in general from styrene, $\alpha$-methylstyrene and the copolymers thereof, preferred comonomers here being acrylonitrile, methacrylonitrile and methyl methacrylate.

Preferred core/shell graft rubbers contain a flexible core and a rigid shell or a rigid core and a first flexible shell and at least one further rigid shell. Functional groups, such as carbonyl, carboxyl, anhydride, amido, imido, carboxylic ester, amino, hydroxyl, epoxy, oxazolyl, urethane, urea, lactam or halobenzyl, are preferably incorporated by adding suitable functionalized monomers during the polymerization of the final shell. Examples of suitable functionalized monomers are maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core/shell graft rubber. The weight ratio of flexible to rigid components is in general from 1:9 to 9:1, preferably from 3:7 to 8:2.

Such rubbers which increase the toughness of polyamides are known per se and are described, for example, in EP-A 208 187.

A further group of suitable impact modifiers B) are thermoplastic polyester elastomers. Polyester elastomers are understood as meaning segmented copolyetheresters which contain long-chain segments derived as a rule from poly-(alkylene) ether glycols and short-chain segments derived from low molecular weight diols and dicarboxylic acids. Such products are known per se and are described in the literature, for example in U.S. Pat. No. 3 651 014. Corresponding products are also commercially available under the names Hytrel® (Du Pont), Arnitel® (Akzo) and Pelprene® (Toyobo Co. Ltd.).

Mixtures of different rubbers may of course also be used.

The novel molding materials may contain, as further component, from 0 to 60, preferably from 5 to 40, in particular from 10 to 35, % by weight of a fibrous or particulate filler or of a mixture thereof.

Preferred fibrous reinforcing materials are carbon fibers, potassium titanate whiskers, Aramid fibers and particularly preferably glass fibers. When glass fibers are used, they may be provided with a size and an adhesion promoter in order to improve the compatibility with the thermoplastic polyamide (C). In general, the glass fibers used have a diameter of from 6 to 20 µm.

These glass fibers can be incorporated in the form of both short glass fibers and rovings. In the finished injection molded article, the average length of the glass fibers is preferably from 0.08 to 0.5 mm.

Suitable particulte fillers are amorphous silica, asbestos, magnesium carbonate (chalk), powdered quartz, mica, talc, feldspar and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

The novel molding materials may furthermore contain flameproofing agents B) in a concentration of from 0 to 20, preferably from 1 to 15, in particular from 3 to 10, % by weight, based on the total weight of the molding material.

Suitable flameproofing agents are, for example, polyhalobiphenyl, polyhalodiphenyl ether, polyhalophthalic acid and their derivatives, polyhalooligocarbonates and polyhalopolycarbonates, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol and derivatives thereof.

A preferred flameproofing agent B) is elemental phosphorus. As a rule, the elemental phosphorus may be desensitized or coated with, for example, polyurethanes or aminoplasts. Masterbatches of red phosphorus, for example in a polyamide, elastomer or polyolefin, are also suitable.

Combinations of elemental phosphorus with 1,2,3,4,7,8, 9,10,13,13,14,14-dodecachloro-1,4,4a,5,6,6a,7,10,10a, 11,12,12a-dodecahydro-1,4:7,10-dimethanodibenzo[a,e]cyclooctane (Dechlorane® Plus, Occidental Chemical Corp.) and, if required, a synergistic agent, eg. antimony trioxide, are particularly preferred.

Phosphorus compounds, such as organic phosphates, phosphonates, phosphinates, phosphine oxides, phosphines or phosphites, are also preferred. Triphenylphosphine oxide and triphenyl phosphate are examples. They may be used alone or as a mixture with hexabromobenzene or a chlorinated biphenyl, and, if desired, antimony oxide.

Typical for the preferred phosphorus compounds which may be used according to the present invention are those of the following general formula

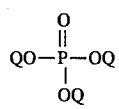

where Q are identical or different hydrocarbon radicals, such as alkyl, cycloalkyl, aryl, alkyl-substituted aryl or aryl-substituted alkyl, or halogen, hydrogen or a combination thereof, provided that at least one of the radicals Q is aryl.

Examples of such suitable phosphates are, for example, phenyl bisdodecylphosphate, phenyl bisneopentyl phosphate, phenylethylene hydrogen phosphate, phenyl bis-(3,5,5'-trimethylhexyl) phosphate, ethyl diphenyl phosphate, 2-ethylhexyl di-p-tolyl phosphate, bis-(2-ethylhexyl) phenyl phosphate, tri-(nonylphenyl) phosphate, phenyl methyl hydrogen phosphate, didodecyl p-tolyl phosphate, tricresyl phosphate, triphenyl phosphate, dibutyl phenyl phosphate and diphenyl hydrogen phosphate. The preferred phosphates are those in which each radical Q is aryl. The most preferred phosphate is triphenyl phosphate. The combination of triphenyl phosphate with hexabromobenzene and antimony trioxide is also preferred.

Suitable flameproofing agents are also compounds which contain phosphorus-nitrogen bonds, such as phosphonitrile chloride, phosphoric ester amides, phosphoric ester amines, phosphoramides, phosphonamides, phosphinamides, tris-(aziridinyl)-phosphine oxide or tetrakis-(hydroxymethyl)-phosphonium chloride. These flame-retardant additives are for the most part commercially available.

Further suitable flameproofing agents are hydroxides of magnesium, which may be coated with silane compounds.

Other halogen-containing flameproofing agents are tetrabromobenzene, hexachlorobenzene and hexabromobenzene as well as halogenated polystyrenes and polyphenylene ethers.

The halogenated phthalimides described in DE-A-19 46 924 may also be used. Among these, N,N'-ethylenebistetrabromophthalimide has become particularly important.

Further conventional additives and processing assistants may be present in amounts of up to 20, preferably up to 10, % by weight, based on the total weight of components A) to C).

Conventional additives are, for example, stabilizers and antioxidants, heat stabilizers and UV stabilizers, lubricants and mold release agents, dyes, pigments and plasticizers.

Antioxidants and heat stabilizers which may be added to the thermoplastic materials according to the invention are, for example, halides of metals of Group I of the Periodic Table, for example sodium halides, potassium halides and lithium halides, if necessary in combination with copper(I) halides, for example chlorides, bromides or iodides. Zinc fluoride and zinc chloride may also be used. Sterically hindered phenols, hydroquinones, substituted members of this group and mixtures of these compounds may also be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Materials for increasing the shielding against electromagnetic waves, such as metal flakes, metal powders, metal fibers and metal-coated fillers may also be present.

Lubricants and mold release agents, which as a rule are added to the thermoplastic material in amounts of up to 1% by weight, are stearic acid, stearyl alcohol, alkyl stearates and stearamides, as well as esters of pentaerythritol with long-chain fatty acids.

The additives include stabilizers which prevent the decomposition of the red phosphorus in the presence of moisture and atmospheric oxygen. Examples are compounds of cadmium, of zinc, of aluminum, of silver, of iron, of copper, of antimony, of tin, of magnesium, of manganese, of vanadium, of boron, of aluminum and of titanium. Particularly suitable compounds are, for example, oxides of the stated metals, as well as carbonates, hydroxycarbonates, hydroxides and salts of organic or inorganic acids, such as acetates, phosphates, hydrogen phosphates or sulfates.

The novel molding materials may contain, as the preferred stabilizer B), at least one phosphorus-containing inorganic acid or a derivative thereof, in amounts of up to 1000, preferably from 30 to 200, in particular from 50 to 130, ppm, based on the phosphorus content of the compounds.

Preferred acids are hypophosphorous acid, phosphorous acid and phosphoric acid and the salts thereof with alkali metals, sodium and potassium being particularly preferred. Organic derivatives of these acids are to be understood as meaning preferably ester derivatives of the abovementioned acids with fatty acids, the fatty acids being of 12 to 44, preferably 22 to 40, carbon atoms. Examples are stearic acid, behenic acid, palmitic acid and montanic acid.

Examples of UV stabilizers, which in general are used in amounts of up to 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may furthermore be added as colorants.

Sodium phenylphosphinate, alumina, silica, nylon 22 and preferably talc may be used as nucleating agents.

Lubricants and mold release agents, which are usually used in amounts of up to 1% by weight, are preferably long-chain fatty acids (for example stearic acid or behenic acid, the salts thereof (for example calcium stearate or zinc stearate) or ester derivatives (for example stearyl stearate or pentaerythrityl tetrastearate) and amide derivatives (for example ethylenebisstearylamide).

Examples of plasticizers are dioctyl phthalate, dibenzyl phthalate, butyl benzyl phthalate, hydrocarbon oils, N-(n-butyl)benzenesulfonamide and o- and p-tolylethanesulfonamide.

The novel thermoplastic molding materials contain, as component C), from 10 to 80, preferably from 20 to 70, in particular from 25 to 60, % by weight of a low molecular weight polyamide having a viscosity number of from 40 to 185, preferably from 100 to 160, in particular from 120 to 145, ml/g, measured in a 0.5% strength by weight solution in concentrated sulfuric acid at 25° C. (according to DIN 53 727).

Examples of polyamides which may be used for the preparation of component C) are thermoplastic semicrystalline polyamides.

Suitable polyamides can be prepared, for example, by condensation of equimolar amounts of a saturated dicarboxylic acid of 4 to 12 carbon atoms with a diamine of 4 to 14 carbon atoms or by condensation of ω-aminocarboxylic acids or polyaddition of lactams.

Examples of polyamides are polyhexamethyleneadipamide, polyhexamethyleneazelamide, polyhexamethylenesebacamide, polyhexamethylenedodecanediamide, polytetramethyleneadipamide and the polyamides obtained by ring cleavage of lactams, such as polycaprolactam and polylaurolactam.

As a rule, these semicrystalline polyamides are linear.

Polytetramethyleneadipamide, polyhexamethyleneadipamide, polyhexamethylenesebacamide and polycaprolactam and copolyamides obtained from terephthalic acid, hexamethylenediamine and ε-caprolactam or from terephthalic acid, isophthalic acid, if required adipic acid and hexamethylenediamine and containing more than 50% by weight of terephthalic acid/hexamethylenediamine units are particularly preferred, in particular polyhexamethyleneadipamide and polycaprolactam. However, mixtures of different polyamides may also be used.

The low molecular weight polyamides or polyamide prepolymers having a viscosity number of from 40 to 185, ml/g (component C) can be prepared, for example, by the processes described in EPA 129 195, EP-A 129 196 and EP-A 299 444. Further conventional preparation methods, which may be batchwise or continuous, are known to a person skilled in the art, so that further information is unnecessary here.

These low molecular weight polyamides or polyamide prepolymers preferably have a terminal group difference (difference between NH2 terminal groups and COOH terminal groups) of <70, preferably 40, mmol/kg of polyamide. The terminal amino groups are particularly preferably present in a small excess of from 10 to 30 mmol/kg of polyamide. The preparation of polyamides having certain terminal group ratios is known to a person skilled in the art, so that further details are unnecessary here.

In a preferred procedure, the low molecular weight polyamide is passed in the form of the melt through a discharge zone with simultaneous removal of the residual water present in the melt. Suitable discharge zones are, for example, devolatilization extruders. The melt freed in this manner from water is then extruded and the extrudates are granulated. The resulting granules (component C) are melted at about 20° C. above the melting point of component C) (in the case of polyhexamethyleneadipamide at about 280° C.), preferably in a twin-screw extruder, and are mixed with component A) and, if required, component B), extruded, cooled and granulated.

In a particularly preferred embodiment, it is also possible to introduce component A) and, if required B) into the devolatilization extruder itself, in which case said extruder is usually equipped with suitable mixing elements, such as kneaders. Subsequently, extrusion is likewise carried out and the extrudates are cooled and granulated.

The PPE/PPA blends are then subjected, as a rule, to a further thermal treatment. The molding material present in the particular processing form is heated in heating units, for example a tumbler-mixer or a continuous or batchwise heating tube, until the viscosity number of the polyamide reaches the desired viscosity number of ≧200, preferably ≧240, in particular ≧250, ml/g. The temperature range of the heating depends on the melting point of pure component C). Preferred heating ranges are from 5° to 50° C., preferably from 20° to 30° C., below the particular melting point of A). The novel process is preferably carried out in an inert gas atmosphere, nitrogen or superheated steam being preferred as the inert gas.

The residence times are in general from 0.5 to 50, preferably from 4 to 24, hours. The heating presents no problems since the polyphenylene ether does not hinder the increase in the molecular weight of the polyamide. The molding materials are then converted into shaped articles by means of conventional apparatuses for blow molding, profile extrusion and pipe extrusion.

The melt viscosity of the PPE/PA molding materials is increased to such an extent that moldings which have a uniform wall thickness over the entire shaped article, in particular moldings containing glass fibers and having a large volume, can be produced. Examples of applications are fuel containers, lubricant containers and brake fluid containers in motor vehicles.

EXAMPLES

Component A

90% by weight of poly-2,6-dimethyl-1,6-dimethylphenylene ether having a reduced specific viscosity of 0.6 dl/g (1% strength by weight in chloroform at 25° C.)

8% by weight of polystyrene (MFI at 200° C./5 kg load: 24 g/10 min), 1.95% by weight of fumaric acid and 0.05% by weight of 3,4-dimethyl-3,4-diphenylhexane were metered into a twin-screw extruder (ZSK 30 from Werner & Pfleiderer), melted in a first part with the use of kneading elements at 270° C., reacted in a second part with kneading and with the use of kneading elements at 280° C. and then devolatilized in a devolatilization zone at 300° C. under reduced pressure. The average residence time in the extruder was 1.5 minutes.

Component B

B/1 Sodium phosphite×5 H$_2$O (from Merck)

B/2 CuI/KI in a ratio of 1:10.

B/3 Ethylenebistearylamide

B/4 Cut glass fibers (Gevetex® 537 from Vetrotex), having an average fiber diameter of 10 μm and a length of 4.5 mm.

B/5 Styrene/butadiene four-block copolymer having a styrene content of 41% by weight; Shore A hardness according to DIN 53505:87 (Tufprene® A from Asahi Chem.)

Component C (before processing)

C/1 Polyamide 66 having a number average molecular weight of 22,000 g/mol (Ultramid® A3 from BASF AG);

| | |
|---|---|
| Viscosity number (VN): | 144 ml/g (according to DIN 53 727) |
| Terminal groups: | 68 mmol/kg NH$_2$, 58 mmol/kg COOH |

C/2 Polyamide 66 having a viscosity number of 60 ml/g (Ultramid® A15 from BASF AG)

C/3 Polyamide 66 having a viscosity number of 182 ml/g

C/4 Polyamide 6/6T:70% by weight of units derived from terephthalic acid/hexamethylenediamine and 30% by weight of units derived from ε-caprolactam. Viscosity number: 125 ml/g (Ultramid® T KR 4351 from BASF AG)

C/5V Polyamide 66 having a viscosity number of 228 ml/g (Ultramid® A4 from BASF AG)

C/6V Polyamide 66 having a viscosity number of 283 ml/g (Ultramid® A5 from BASF AG). V=for comparison.

Preparation of the molding materials

EXAMPLES 1–6

Component C/1 was melted in a twin-screw extruder (ZSK 30 from Werner & Pfleiderer) at 290° C. and was mixed with components B/2 (100 ppm, based on the amount of CuI/KI used, of Cu), 0.3% by weight of B/3 and 130 ppm, based on the phosphorus content of component B/1, of phosphorus (throughput 20 kg/h, 200 rpm). Component A) was metered into the melt via a side extruder. The product was extruded, cooled in a waterbath, granulated and dried. The granules were then subjected to postcondensation at 175° C. under nitrogen in a tumble-dryer to the viscosity number stated in the table.

Rectangular hollow articles having a cross-section of 18.5×18.5 cm and a length of 61 cm (volume about 21 l, weight from 1 to 2 kg) were produced on an extrusion blow-molding machine (from Voith) at 290° C. by means of batchwise procedure.

EXAMPLES 7–9

Component C/2 was compounded with components B and A by a preparation method similar to that described in Examples 1–7, and the mixture was subjected to a thermal aftertreatment and processed to give blow-molded articles.

EXAMPLES 10 and 11

The preparation procedure and processing corresponded to Examples 1 to 7, but the polyamide used was component C/3.

EXAMPLES 12 and 13

The preparation procedure and processing corresponded to Examples 1 to 7 but the polyamide used was C/4, the compounding was carried out at 325° C. and the processing to blow-molded articles at 325° C.

EXAMPLES 14 to 16

The preparation procedure and processing corresponded to Examples 1–7 but the polyamides C used were C/5 V and C/6 V.

Methods of measurement:

The wall thickness was determined by measurements 10 cm below the bottom and 10 cm above the lid of the hollow articles.

The MVR of the products was measured according to DIN 53 735 at 280° C./10 kg (Examples 12 and 13): 325° C./10 kg). After the PPE phase had been separated off and extraction with toluene carried out, the viscosity number of the PA phase (0.5% strength in 96% strength $H_2SO_4$ at 25° C.) was measured according to DIN 53 727.

The results of the measurements and the compositions of the molding materials are shown in the table.

| | Composition [% by weight] | | | | Heating | | | | | |
| --- | --- | --- | --- | --- | --- | --- | --- | --- | --- | --- |
| Example | PA | PPE | Rubber | Glass Fibers | VN PA[a)] [ml/g] | time [h] | VN PA[b)] [ml/g] | MVR [g/10°] | $d_{top}$ [mm] | $d_{bottom}$ [mm] |
| 1* | 50 C/1 | 39.7 A | 10 B/5 | [001f] | 144 | 0 | 138 | 22 | np | np |
| 2 | 50 C/1 | 39.7 A | 10 B/5 | — | 144 | 12 | 220 | 5 | 2.5 | 4 |
| 3 | 50 C/1 | 39.7 A | 10 B/5 | — | 144 | 18 | 256 | 2 | 3.0 | 3.8 |
| 4 | 50 C/1 | 39.7 A | 10 B/5 | — | 144 | 24 | 270 | <1 | 3.4 | 3.5 |
| 5* | 40 C/1 | 29.7 A | — | 30 B/4 | 144 | 0 | 135 | 14 | np | np |
| 6 | 40 C/1 | 29.7 A | — | 30 B/4 | 144 | 18 | 240 | <1 | 2.8 | 3.1 |
| 7* | 50 C/2 | 39.7 A | 10 B/5 | — | 60 | 0 | 72 | 100 | np | np |
| 8 | 50 C/2 | 39.7 A | 10 B/5 | — | 60 | 18 | 205 | 3.3 | 2.9 | 3.9 |
| 9 | 50 C/2 | 39.7 A | 10 B/5 | — | 60 | 24 | 250 | 1.2 | 3.4 | 3.7 |
| 10* | 50 C/3 | 39.7 A | 10 B/5 | — | 182 | 0 | 138 | 18 | np | np |
| 11 | 50 C/3 | 39.7 A | 10 B/5 | — | 182 | 18 | 222 | 2.6 | 3.2 | 3.9 |
| 12* | 50 C/4 | 39.7 A | 10 B/5 | — | 125 | 0 | 120 | 28 | np | np |
| 13 | 50 C/4 | 39.7 A | 10 B/5 | — | 125 | 18 | 245 | 2 | 3.4 | 2.8 |
| 14* | 50 C/5 V | 39.7 A | 10 B/5 | — | 228 | 0 | 149 | 18 | 0.9 | 5 |
| 15* | 50 C/5 V | 39.7 A | 10 B/5 | — | 228 | 18 | 190 | 5 | 2.3 | 4.1 |
| 16* | 50 C/6 V | 39.7 A | 10 B/5 | — | 283 | 0 | 155 | 7 | 1 | 5 | np = not processable
*)for comparison
[a)]VN of the polyamide before compounding and postcondensation
[b)]VN of the polyamide after compounding but before postcondensation

We claim:

1. A high molecular weight thermoplastic molding material obtained by mixing
    A) 20–80% by weight of a polyphenylene ether and
    B) 0–70% by weight of conventional additives and processing assistants
into a melt of
    C) 10–80% by weight of a low molecular weight polyamide 15 having a viscosity number of from 40 to 185 ml/g
and subsequently carrying out solid-phase postcondensation.

2. A high molecular weight thermoplastic molding material as claimed in claim 1, wherein the polyamide C) has a viscosity number of at least 200 ml/g after the solid-phase postcondensation.

3. A high molecular weight thermoplastic molding material as claimed in claim 1, wherein up to 50% by weight, based on A), of the polyphenylene ether A) are replaced by a vinylaromatic polymer.

4. A high molecular weight thermoplastic molding material as claimed in claim 1, wherein the polyphenylene ether A) is modified by incorporating at least one carbonyl, carboxyl, anhydride, amido, imido, carboxylic ester, carboxylate, amino, hydroxyl, epoxy, oxazolyl, urethane, urea, lactam or halobenzyl group.

5. A high molecular weight thermoplastic molding material as claimed in claim 1, wherein a phosphorus-containing inorganic acid or a derivative thereof is used as a stabilizer (as component B)) in amounts of up to 1000 ppm.

6. A process for the preparation of a high molecular thermoplastic molding material as claimed in claim 1, wherein component A) and, if required, B) are added to the melt of component C), component C) having a viscosity number $\leqq 185$ ml/g, and this mixture is then subjected to a thermal aftertreatment at from 5° to 50° C. below the melting point of the pure component C) under inert gas conditions over a period of from 0.5 to 50 hours.

7. A method of using a high molecular weight thermoplastic molding material as claimed in claim 1 for the production of moldings by blow molding, profile extrusion or pipe extrusion.

8. A blow-molded article obtained from a high molecular weight thermoplastic molding material as claimed in claim 1.

9. An extruded profile, obtained from a high molecular weight thermoplastic molding material as claimed in claim 1.

10. An extruded pipe, obtained from a high molecular weight thermoplastic molding material as claimed in claim 1.

* * * * *